United States Patent [19]

Andrews et al.

[11] Patent Number: 4,534,011
[45] Date of Patent: Aug. 6, 1985

[54] PERIPHERAL ATTACHMENT INTERFACE FOR I/O CONTROLLER HAVING CYCLE STEAL AND OFF-LINE MODES

[75] Inventors: Lawrence P. Andrews; Chester A. Heath; Justin E. Mead; Richard G. VanDuren; Gary A. Janes, all of Boca Raton, Fla.

[73] Assignee: International Business Machines Corp., Armonk, N.Y.

[21] Appl. No.: 345,129

[22] Filed: Feb. 2, 1982

[51] Int. Cl.³ .............................................. G06F 15/16
[52] U.S. Cl. ................................................. 364/900
[58] Field of Search ... 364/200 MS File, 900 MS File

[56] References Cited

U.S. PATENT DOCUMENTS

| 3,902,162 | 8/1975 | Parkinson et al. | 364/200 |
|---|---|---|---|
| 4,128,876 | 12/1978 | Ames et al. | 364/200 |
| 4,150,438 | 4/1979 | Dorey et al. | 364/900 |
| 4,172,281 | 10/1979 | Gordon | 364/200 |
| 4,191,998 | 3/1980 | Carmody | 364/200 |
| 4,245,307 | 1/1981 | Kapeghian et al. | 364/200 |
| 4,309,754 | 1/1982 | Dinwiddie, Jr. | 364/200 |
| 4,393,464 | 7/1983 | Knapp et al. | 364/900 |
| 4,490,782 | 12/1984 | Dixon et al. | 364/200 |
| 4,493,028 | 1/1985 | Heath | 364/200 |

*Primary Examiner*—Raulfe B. Zache
*Assistant Examiner*—A. E. Williams, Jr.
*Attorney, Agent, or Firm*—Robert Lieber

[57] ABSTRACT

This I/O interface permits attachment of a data processing system to devices having different "handshaking" protocols and bit-parallel data exchange capacities. Handshaking control circuits permit the system to communicate with devices variously in pulsed and interlocked modes. Timer circuits provide a variety of different time reference signals for transfer to devices. Switching options associated with the timer permit selective use of timer outputs as pulsed mode handshaking functions. A counter circuit and associated interface port permit the system to count events associated with device-originated pulses. A switching option permits the counter incrementing operations to be governed by timer outputs. The interface also contains path selection lines. In one mode these lines define high speed exchange of data between a primary system processor and devices in various bit-parallel formats and over various buses designatable by a systems processor. In another mode these lines permit a secondary system processor to exchange data with a series of multiplexed devices. Collectively, the interface lines have a symmetrical configuration which permits their use for direct interconnection of two data processing systems without the expense of additional "channel to channel" adaptation.

7 Claims, 22 Drawing Figures

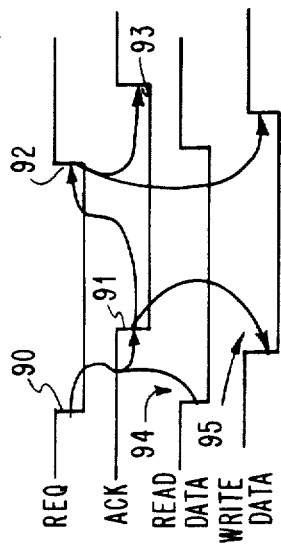
FIG. 6 (b) INTERLOCKED (LATCHED) MODE
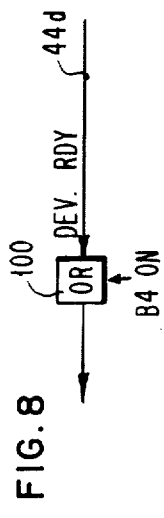
FIG. 8
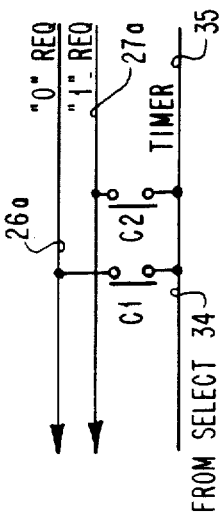
FIG. 10
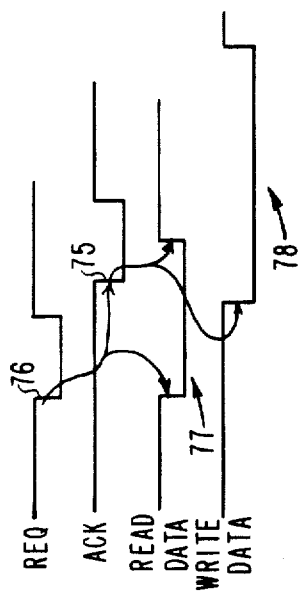
FIG. 6 (a) PULSED MODE
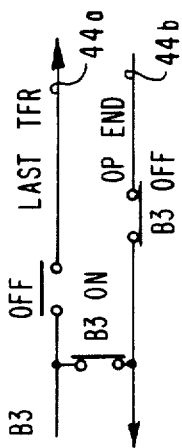
FIG. 7
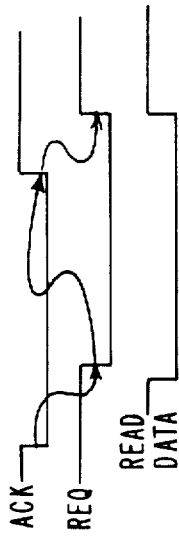
FIG. 9

FIG. 19 ARRAY INDEXING

PERIPHERAL ATTACHMENT INTERFACE FOR I/O CONTROLLER HAVING CYCLE STEAL AND OFF-LINE MODES

CROSS-REFERENCES TO RELATED APPLICATIONS

Co-pending application Ser. No. 345,177 filed Feb. 2, 1982 by C. A. Heath, entitled "Peripheral Interface Adapter Circuit For Use in I/O Controller Card Having Multiple Modes of Operation" discloses adapter equipment for transferring data between a processing system and devices with various bit-width formats and bus path selection protocols.

Application Ser. No. 345,101 filed Feb. 2, 1982 by C. A. Heath et al, entitled "Cycle Stealing I/O Controller With Programmable Off-Line Mode of Operation", now issued U.S. Pat. No. 4,451,884 discloses a system having primary and secondary processors and a cycle stealing adapter which can operate relative to the subject interface in high speed (HS) and programmable offline (PO) modes discussed herein in reference to the operations of certain interface lines.

BACKGROUND OF THE INVENTION

This invention relates to I/O interfaces for connecting data processing systems to peripheral devices and other systems.

Existing data processing systems generally employ different types of I/O channels for exchanging data with differently structured peripheral devices and special adapting equipment for data communications with other systems. Such channels and adapters generally have specialized or limited applications which permit a system user to attach certain devices or other systems with ease, and other devices or systems only with difficulty and added expense. An object of the present invention is to provide an interface architected to enlarge the range of devices which can be economically attached to a system and also permit economic attachment of "peer" systems.

SUMMARY OF THE INVENTION

An interface in accordance with the present invention comprises: data and handshaking ports, switching options associated with the handshaking ports for operating variously in pulsed and interlocked handshaking modes, a timer circuit and associated timer signal transmission port enabling the system to supply various time reference signals to devices, switching options permitting selective use of timer outputs to stimulate certain handshaking functions, a counter and associated count incrementing port for enabling the system to count events associated with incrementing pulses presented by a device, a switching option for gating count increments with timer outputs, and "path selection" ports for enabling the system to present mode and format signals to devices with various path selection connotations.

When the system is operated in a first high speed mode, signals transferred through the path selection ports condition a device to send data to the system or receive data from the system in a selected one of several formats and over a selected one of several busing configurations attached to the data ports of the system. The selectable formats include bit widths of 8, 16 and 32 bits and unidirectional or bidirectional bus usage. In the unidirectional mode read/input and write/output transfers are conducted over two different data buses. In one bidirectional mode array addressing information is sent to the device over one data bus and associated portions of an ordered data array are sent over the other bus.

When the system is operated in a second ("programmable offline") mode—in which a secondary processor, serving in the high speed mode simply to prepare transfers between a primary processor in the system and devices, and to conduct certain "housekeeping" operations, is conditioned to process data relative to the interface and/or the primary processor—signals presented at the path selection ports condition multiplexing apparatus at the device side of the interface to transfer data relative to plural device paths in multiplex.

The interface ports are designed with a pre-determined symmetry permitting direct attachment of a "peer" system to the associated system, saving the system user the expense of adding specialized "channel-to-channel" adaptation equipment.

For a more complete understanding of the invention and a comprehension of other advantages and features thereof, reference should be made to the following description taken in connection with the accompanying drawings, and to the appended claims which indicate the scope of the invention.

BRIEF DESCRIPTION OF THE DRAWINGS

FIGS. 4–10 indicate presently relevant interface operations made available by certain of the option switches.

DETAILED DESCRIPTION OF THE ILLUSTRATED EMBODIMENT

Figure 1:
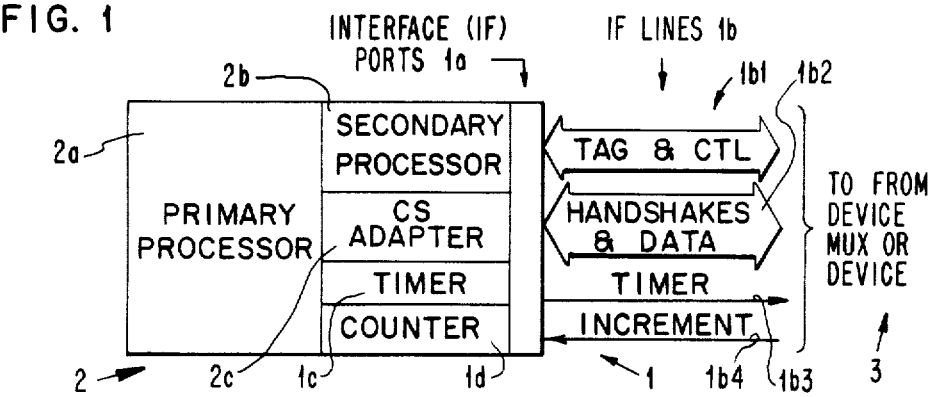
FIG. 1 provides a general view of the subject interface in a typical system environment in which all of its various features may be advantageously used.

FIG. 1 illustrates a system environment in which all of the features of the subject interface may be used beneficially. The interface is shown at 1 and an associated processing system and a device or devices are shown respectively at 2 and 3. As will be noted later, in reference to FIG. 15, the symmetry of the interface lines permits direct attachment of a "peer" system instead of a device or devices, without need for additional adaptation equipment.

System 2 comprises a primary processor 2a, a secondary processor 2b and an adapter 2c. The primary processor may be an IBM Series/1 processor. Relevant details of secondary processor 2b and adapter 2c are contained in the above cross-referenced copending applications.

Adapter 2c transfers data between the interface and either the primary processor 2a or the secondary processor 2b. When transferring data to primary processor 2a the adapter may be conditioned by the secondary processor 2b to operate either in an autonomous mode (i.e. independent of the secondary processor) or in a direct controlled (step-by-step mode). The adapter performs various bit-parallel format conversion functions permitting data to be passed between the processors and the interface in units of 8, 16 or 32 parallel bits and through various busing paths (as described in the copending application by Heath, BC9-81-011, referenced above). The adapter has cycle stealing (direct) access to the memory of processor 2a for carrying out such transfers at high speed. When transferring data in the direct controlled mode the adapter transfers fixed amounts of data between either the primary or secondary processor and the interface.

The interface comprises port circuits 1a associated with the secondary processor and adapter, lines 1b for attaching to the device or devices, a timer circuit 1c, and a counter circuit 1d. The lines 1b include tag and control lines 1b1, handshake and data transfer lines 1b2, a timer line 1b3 and a count increment line 1b4. The tag and control lines transfer tag and control signals between system 2 and device(s) 3. The handshake and data lines respectively carry handshaking (data timing) signals and data signals between the system and devices. The timer line transfers time reference signals from timer 1c to the device(s) and the increment line transfers incrementing signals from the device(s) to counter 1d.

The device or devices 3 have not-shown port circuits which connect to the interface lines 1b. The functions of these circuits will be evident from the description below of the port circuits 1a.

Figure 2:
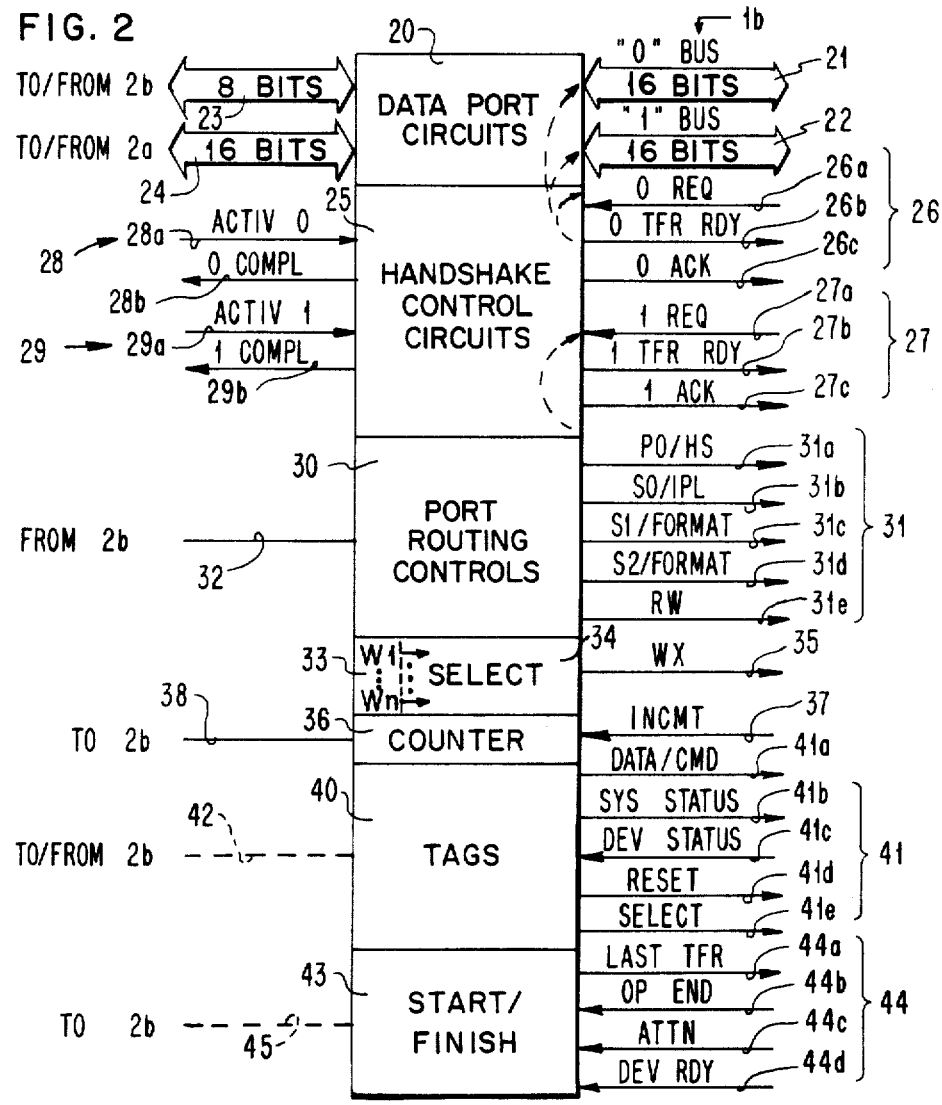
FIG. 2 provides a more detailed view of port elements of the subject interface and a schematic block view of associated circuit elements.

FIG. 2 indicates additional details of the interface 1. Data port circuits 20 connect interface data buses 21 and 22 selectively to processor buses 23 and 24. Bus 23 connects to secondary processor 2b and bus 24 connects to primary processor 2a. The interface buses 21 and 22 are each 16 bits wide. Bus 23 is an 8 bit wide bus and bus 24 is a 16 bit wide bus. In making connections between buses 21 and 22 and buses 23 and 24 the adapter performs format conversions for accommodating bit-width differences. The adapter circuits 20 also permit data to be passed over half portions of buses 21 and 22 for accommodating 8-bit wide transfers at the interface 1.

Handshake control circuits 25 connect interface handshaking control lines 26 and 27 selectively to "system" handshaking control lines 28 and 29. Lines 26 and 28 are associated with data transfers relative to bus 21, and lines 27 and 29 are associated with data transfers relative to bus 22. Lines 26 (respectively 27) comprise three basic line elements, a request element 26a (respectively 27a), a transfer ready element 26b (respectively 27b) and an acknowledge element 26c (respectively 27c).

Bus 21 is also referred to herein as the 0 bus and the associated handshakihg lines 26a, b, c are referred to as 0 request (0 REQ), 0 transfer ready (0 TFR RDY) and 0 acknowledge (0 ACK) lines. Similarly, bus 22 is referred to as the "1"data bus and its associated handshaking lines 27a, b, c are referred to as 1 request (REQ), 1 transfer ready (TFR RDY) and 1 acknowledge (ACK).

As will be described below, the system and interface may operate in either pulsed or interlocked handshaking modes relative to devices. In the pulsed mode acknowledge pulses trail request pulses and the leading edge of each acknowledge pulse is dependent in time on the leading edge of a preceding request pulse. The transfer ready line is not used. In the interlocked mode acknowledge pulses trail request pulses and have leading and trailing edge dependencies. The acknowledge leading edge is also dependent on a transfer ready condition which may or may not be sent to the device.

In an optional pulsed mode operation described below timing functions derived from the timer 1c (FIG. 1) are steered to port inlets of request line 26a or 27a to stimulate actions normally originated remotely by devices. In this mode only the acknowledge line is attached to the device. In an optional interlocked mode, employed for input (read) transfers from a "peer" system, incoming request pulses trail outgoing acknowledge pulses and request pulse edges are time dependent on preceding acknowledge pulse edges (i.e. the reverse of "normal" interlocked mode).

Port circuits 30 control the "routing" of data by means of pulse signals presented on interface lines 31. Circuits 30 operate in response to command signal functions applied by secondary processor 2b via lines 32.

Lines 31 include a mode indicating line 31a "path selection" lines 31a, 31b, 31c and 31d, and "read/write" (R/W) line 31e. Line 31a distinguishes operation of system 2 in "high speed" or programmable offline (PO) mode. In HS mode adapter 2c (FIG. 1), after being conditioned by secondary processor 2b, operates autonomously through its direct cycle stealing access to the memory of primary processor 2a to transfer data between that memory and interface bus lines 21 and/or 22. In PO mode processor 2b operates in an offline context relative to processor 2a to transfer data between its memory and either the interface or processor 2a, and to process data in its memory.

Lines 31b–31e in association with mode line 31a define a data routing path. In HS mode line 31b is pulsed to indicate an initial program loading (IPL) operation, and lines 31c and 31d are variously pulsed to indicate a format of 8, 16 or 32 bits at the interface, and either a unidirectional or bidirectional transfer mode. The device interprets the unidirectional transfer mode in association with a write (output) indication on line 31e as requiring data to be transferred to the device only via bus 21, and in association with a read (input) indication as requiring data to be transferred to the system only via bus 22.

Circuits 33 and 34 represent the timer 1c (FIG. 1). Circuits 33 constitute a multiple waveform generator providing waveform outputs W1, W2, . . . , n. Circuits 34 constitute a selection circuit for selecting any one of these waveforms, denoted as Wx, and transferring the selected waveform to the associated interface timer line 35.

Counter 36, which may be preset by not-shown control lines from processor 2b, receives incrementing impulses from the device interface via increment line 37, and when appropriately conditioned by processor 2b, transfers its accumulated digital count information to system 2a or 2b via path 38.

Tag control circuits 40 connect interface tag 1 lines 41a–41e to control inlets and outlets of processor 2b represented at 42. Line 41a distinguishes information presented on bus 21 and/or 22 as either ordinary data (line 41a inactive) or command information (line 41a active). Line 41b is pulsed to indicate a status information recovery operation. Line 41c is pulsed to indicate presentation of status information by the device (via data bus 21 and/or 22). Line 41d is pulsed to reset the device. "Select" line 41e is pulsed and held active to select a device throughout a data transfer process.

Finally, port circuits 43 operate relative to interface lines 44a, 44b, 44c and 44d for starting and finishing data transfers. Line 44d is pulsed to signal a device ready condition permitting the operation to begin. Line 44a is pulsed to indicate that a last unit of data is being transferred across the interface. Line 44b is pulsed as an operation end (OP END) indication by the device to indicate that it is completing its role in a data transfer. Line 44c is pulsed to provide an attention (ATTN) indication to the system. OP END and ATTN indications presented by the device through lines 44b and 44c generally invoke program interruptions in processor 2a (or 2b, or both).

Figure 3:
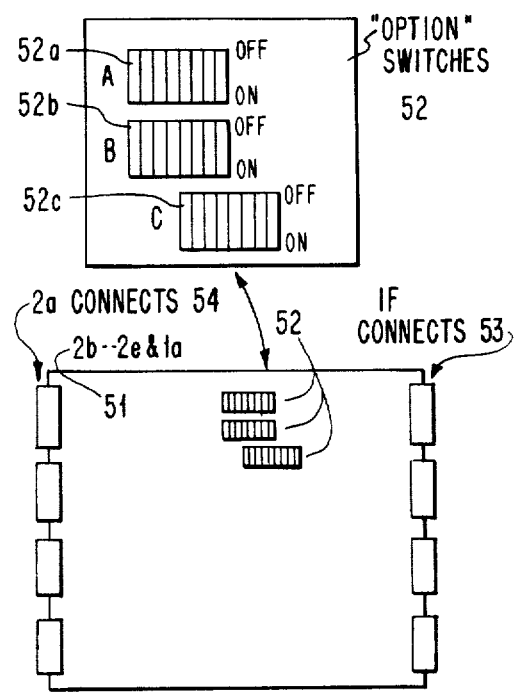
FIG. 3 illustrates an integrated circuit packaging environment for the interface and associated processing and adapting circuit elements of the respective system, with particular delineation of "option" switching elements useful for setting up various optional configurations of the subject interface.

FIG. 3 illustrates an integrated circuit packaging topology for the system and its interface elements, with particular emphasis on certain "option switching" features. Multi-chip card 50 contains space 51 for mounting LSI circuit chips embodying processor 2b (including its memory), cycle stealing adapter 2c, port circuits 1a, timer 1c and counter 1d. In addition, card 50 contains manually settable option switches 52 which provide for certain adaptation functions. Several of these adaptation functions are considered features of the present invention. The option switches may be arranged in several banks 52a, 52b, 52c.

It will be appreciated as this description develops, that presently relevant functions controlled by these switches, could trivially have been implemented by programmed operations of processor 2b. However, since these functions do not change very rapidly in presently contemplated applications, the use of discrete switches is considered more practical and cost-expedient.

The sides of card 50 contain connection terminals 53 and 54. Terminals 53 attach to the interface lines 1b. Terminals 54 attach to processor 2a which is located on one or more additional cards. Card 50 may represent only one of a plurality of I/O channelling attachments to processor 2a, and is hereafter referred to as an attachmen card.

Figure 4:
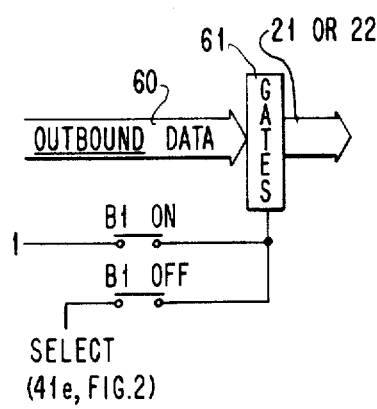

Functions of several of the option switches which are presently relevant are considered next. As shown in FIG. 4, option switch B1 (in bank 52b) selects one of two modes for gating outbound data to interface buses 21 and 22 (FIG. 2). Outbound data on bus 60 flows through gates 61 controlled by the state of switch B1. In the off position of B1 "select" excitation is coupled from select line 41e (FIG. 2) to the gates 61, thereby permitting outbound data to pass through the gates to the interface buses only when the select function is active. In its on position B1 applies a constant enabling (1) level to gate 61 permitting continuous passage of outbound data regardless of the state of the select line.

Figure 5:
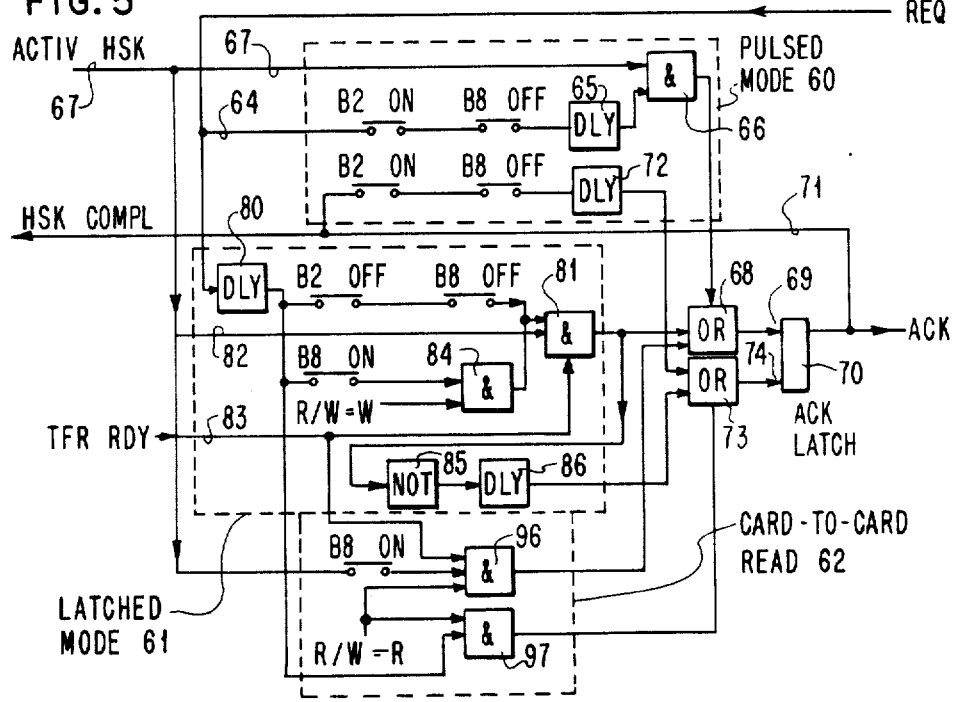

As shown in FIG. 5, various combined positions of option switches B2 and B8 invoke various handshaking modes characteristic of the present invention. Circuits shown in dotted outline at 60 invoke the "pulsed" handshaking mode when B2 is on and B8 is off. In this mode pairs of request and acknowledge pulses have leading edge (but not trailing edge) time dependencies, and acknowledge pulses trail corresponding request pulses.

Circuits shown in dotted outline at 61 invoke the "latched" or "interlocked" handshaking mode when B2 and B8 are both off or B8 is on and a write (system output) data transfer operation is being conducted. In this mode, request and acknowledge pulses have both leading and trailing edge time dependencies and acknowledge trails request.

Circuits shown in dotted outline at 62 operate when B8 is on and a read (system input) transfer is being conducted to invoke a modified latched mode of operation. In this mode data is being read into the system 2 from another "peer" system (operating through an identical interface), requests applied to system 2 trail acknowledges sent out from system 2, and request pulse edges are time-dependent on acknowledge pulse edges.

In respect to circuits 60 request pulses (originating either remotely at a device or internally under conditions described later) pass through line 64 and delay circuit 65 preparing AND circuit 66. Consequently, when activate handshake (ACTIV HSK) on line 67 and REQ output of delay 65 are coincidentally active, AND circuit 66 will transfer a pulse through OR circuit 68 to setting input 69 of acknowledge latch 70. ACTIV HSK is activated when circuits in adapter 2c (FIG. 1) are ready to transfer or receive data (transfer data if a write/output operation is being conducted, receive data if a read/input operation is being carried out). When latch 70 is set, data is transferred via bus 21 and/or bus 22 (FIG. 2). In the set condition latch 70 produces an acknowledge pulse (ACK) which may be sent to the device and also provides a handshake completion indication (HSK COMPL) on line 71 for conditioning adapter 2c and/or processor 2b to conduct another handshaking and data transfer transaction. The completion indication is transferred through delay 72 and OR circuit 73 to the reset (clearing) input 74 of latch 70, terminating the ACK pulse.

As shown in FIG. 6a, in this pulsed mode of operation the leading edge 75 of each acknowledge pulse is tied to the leading edge 76 of a preceding request pulse. If the operation is a read transfer data to be transferred to system 2 is presented by the device with each request pulse and held available for some time after the request pulse ends, as shown at 77. In a write operation data presented by system 2 in association with each acknowledge pulse is held available beyond the acknowledge pulse for a time sufficient to allow its transfer, as shown at 78.

In respect to circuits 61 for latched mode operation (FIG. 5) with B2 and B8 both off request pulses delayed by delay circuit 80 prepare AND circuit 81 for operation in response to coincidence of an ACTIV HSK pulse on line 82 and a transfer ready (TRNS RDY) pulse on line 83. Alternatively, if B8 is on and the operation being conducted is a write AND circuit, 84 becomes active and prepares AND circuit 81. When AND circuit 81 operates setting stimulus is transferred to acknowledge latch 70 via CR 68. In this same mode the output of AND 81 is passed through inverting circuit 85, delay 86 and OR circuit 73 to reset input 74 of latch 71, whereby the trailing edge of the latch setting pulse after a predetermined delay resets the ACK pulse (i.e. in a predetermined lagging time relationship to the trailing edge of the original request pulse).

The timing of the parameters involved in this operation is shown in part (b) of FIG. 6. Request pulse leading edge 90 stimulates leading edge 91 of acknowledge which stimulates lagging edge 92 of request which stimulates lagging edge 93 of acknowledge. Furthermore, the leading edge of request accompanies read/input data as suggested at 94 while acknowledge accompanies output/write data as suggested at 95.

The "card-to-card read" operation associated with operation of circuits 62 will be described later. However, it is noted presently that circuits 62 operate when B8 is on and a read (output) operation is being carried out and ACTIV HSK and TFR RDY are both active to transfer setting excitation to acknowledge latch 70 through AND 96 and OR 68. This causes the acknowledge pulse ACK to be sent out before a corresponding request pulse REQ is received, and when REQ subsequently arrives it is applied—via delay 80, AND 97 and OR 73—to reset input 74 of ACK latch 70 (deactivating ACK after the start of REQ, which in turn causes the remote "peer" system to end REQ). The timing of these functions is shown in FIG. 9.

FIG. 7 illustrates functions of option switch B3. In the off position B3 transfers "last transfer" stimulus to interface line 44a and OP END indications from interface line 44b to the attachment card circuits. However, in the on position B3 feeds last transfer stimulus directly to card/system elements "normally" responsive to OP END interruption, and effectively isolates interface lines 44a and 44b from the system.

FIG. 8 indicates the function of option switch B4 for overriding a not ready indication on the device ready interface line 44d. With B4 off device ready stimulus can only be received through line 44d and OR circuit 100. However, when B4 is on device ready stimulus is continuously presented through the other input of OR 100, overriding the potential existence of an unready indication on interface line 44d.

FIG. 10 indicates the functions of option switches C1 and C2 for respectively steering timer output excitation from select circuit 34 (FIG. 2) to the handshake path associated with either the 0 or 1 request input line (26a or 27a). This option is used in association with the pulsed handshaking mode, as described later, to permit timer outputs to serve as request stimuli.

Figure 11:
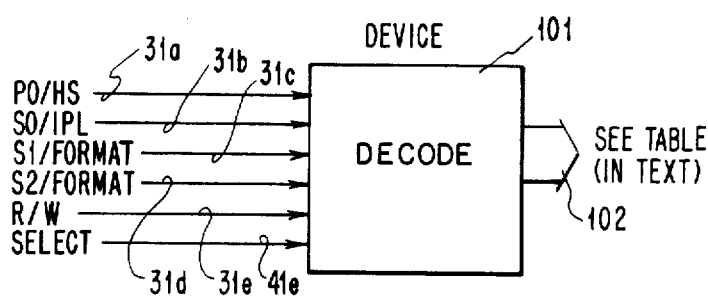
FIG. 11 indicates the logical organization of path selection ports in the subject interface.

FIG. 11 illustrates usage of information presented on interface lines 31a–31e and 41e. Devices responsive to (attached to) these lines contain decoding logic 101 producing outputs 102 in accordance with the following table:

| PO/HS | S0 | S1 | S2 | R/W | SEL | DECODED FUNCTION |
| --- | --- | --- | --- | --- | --- | --- |
| HS | 1 | x* | x* | R | 1 | In HS mode, activation of S0 with SELECT indicates IPL (initial program load) operation |
| HS | x | 0 | 0 | R | 1 | UNIDIRECTIONAL 8-bit Read (U8R); device sends data 8 bits at time over high order half of "1" bus |
| HS | x | 0 | 0 | W | 1 | UNIDIRECTIONAL 8-bit Write (U8W); device to receive data 8 bits at time via high order half of "0" bus |
| HS | x | 0 | 1 | R | 1 | UNIDIR. 16-bit Read (U16R); device to send data 16 bits at time via "1" bus |
| HS | x | 0 | 1 | W | 1 | UNIDIR. 16-bit Write (U16W); device to receive data 16 bits at time via "0" bus |
| HS | x | 1 | 0 | R | 1 | BIDIRECTIONAL 16-bit Read (B16R); device to send data 16 bits at time via "1" bus; if array indexing, device to receive array addresses via "0" bus |
| HS | x | 1 | 0 | W | 1 | BIDIR. 16-bit Write (B16W); device to receive 16 bits at time via "1" bus; if array indexing, device to receive array addresses via "0" bus |
| HS | x | 1 | 1 | R | 1 | BIDIR 32-bit Read (B32R); device sends 32 bits at time via "0" and "1" buses |
| HS | x | 1 | 1 | W | 1 | BIDIR 32-bit Write (B32W); device receives 32 bits at time via "0" and "1" buses |
| PO | s0 | s1 | s2 | R/W | 1 | Send/receive in U16 format; fetch/transfer data from/to one of up to 8 multiplexed sources/sinks defined by digital value of s0, s1, s2; conclude by PO mode protocol |

*signifies "don't care"

As indicated in the foregoing table, when interface line 31a indicates the high speed system operating mode HS (autonomous operation of adapter 2c, FIG. 1, relative to interface 1 and processor 2a) signals on lines 31b, 31c and 31d have separate contexts. S0 (line 31b) active indicates an IPL (initial program loading) operation relative to processor 2a. The binary value of S1 (line 31c) distinguishes between unidirectional and bidirectional data transfer formats explained below, and the binary value of S2 (line 31d) is decoded digitally in combination with the values of S1 and R/W (line 31e) to select a bit-parallel width for the transfer of 8, 16 or 32 bits and one of several bus paths (part or all of 0 bus path 21 for unidirectional writes, part or all of 1 bus path 22 for unidirectional reads, all of bus path 22 for 16-bit bidirectional reads or writes, or all of bus paths 21 and 22 for 32-bit bidirectional reads or writes).

When line 31a signals a PO (programmable off-line) mode of system operation (processing of data by processor 2b in an offline relation to processor 2a) the device selects the 16-bit- unidirectional format and its associated path (bus 21 for writes, bus 22 for reads). The device performs multiplexing and/or demultiplexing operations relative to up to 8 distinct device sources or destinations (sub-addresses) in accordance with sub-address functions represented in combination by values s0, s1 and on lines 31b, 31c and 31d. The sub-addresses may be varied as successive 16-bit data transfers are made, whereby, for instance, 128 bits may be distributed 16 bits at a time to 8 sub-destinations in 8 consecutive data transfer steps of one unidirectional write operation.

Figure 12:
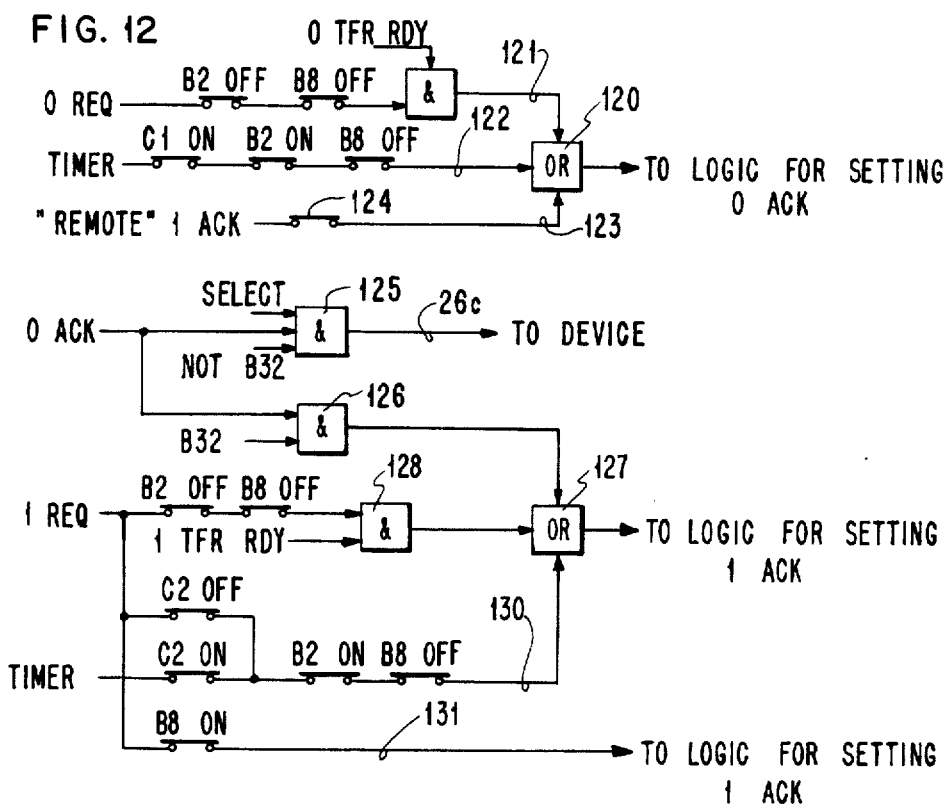
FIG. 12 illustrates details of interface handshaking circuits permitting coordinated operation of the interface in parallel with other identical interfaces (for extending the bit-parallel capacity of the associated system) and other handshaking options.

FIG. 12 indicates in a more complete view options for handshaking which can be provided by the present interface. OR circuit 120 allows for at least three different sources of "request" stimuli for setting the 0 acknowledgment function. Source 121 is active when the device sends 0 requests while latched handshaking mode is effective (B2 and B8 both off), and 0 transfer ready is active. Source 122 is active (relative to OR 120) when the system is in pulsed mode (B2 ON, B8 OFF) and the C1 option switch is on. When active, source 121 transfers timer outputs to OR 120 as "request" stimuli. Source 123 is active when (a previously undiscussed) option switch 124 is set. This transfers 1 ACK excitation from another attachment card to the 0 ACK setting path of the subject attachment card, and in effect permits two attachment cards to be synchronously linked for parallel operation (i.e. to transfer more than 32 bits of data at a time between one system and one or more devices or between two systems and a device.

When the 0 ACK latch is set by one of the source stimuli to OR 120, AND circuits 125 and 126 are partially prepared. If the system is transferring less than 32 data bits at a time across the interface (not B32 and select active) AND circuit 125 permits a 0 ACK pulse to pass to the device via interface line 26c. If the system is passing 32 or more bits of data at a time (B32 active) the output of AND circuit 126 is pulsed preparing logic for setting 1 ACK via OR 127 (setting of 1 ACK in this mode is conditional on the readiness states of circuits in adapter 2c associated with both the 0 and 1 bus paths 21 and 22). When the interface is being operated in latched mode (B2 and B8 off), and less than 32 bits of data at a time are being transferred relative to 1 bus 22 and 1 TFR RDY is active, AND circuit 128, prepares logic for setting 1 ACK via OR 127. If the system is operating in pulsed mode (B2 on, B8 off) to transfer data relative to only the 1 bus, input 130 of OR circuit 127 will be stimulated in response to either outputs from the timer (if C2 is on) or by occurrences of one request pulses (if C2 is off).

If B8 is on, path 131 is activated by 1 RFQ pulses causing 1 ACK to terminate in trailing time dependency on the leading edge of 1 REQ which in turn has trailing time dependence on the leading edge of 1 ACK (refer to FIG. 9 and the explanation of circuits 62, FIG. 5).

Figure 13:
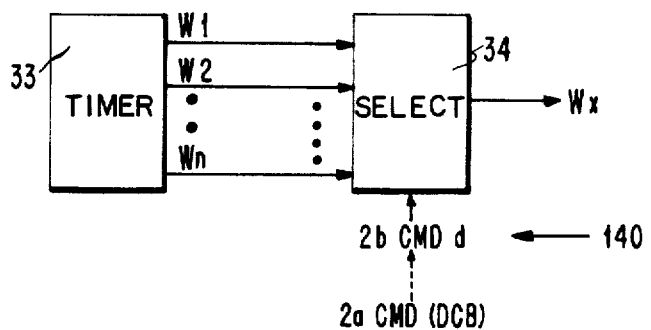
FIGS. 13 and 14 indicate timer and counting features of the subject interface and an option for their interaction.

FIG. 13 indicates at 140 that select circuits 34, associated with timer waveform generation circuits 33, may be operated by commands presented from processor 2b and that the latter commands may be stimulated by command information contained in device control block arrays (DCB's) derived by processor 2b from a memory in processor 2a.

Figure 14:
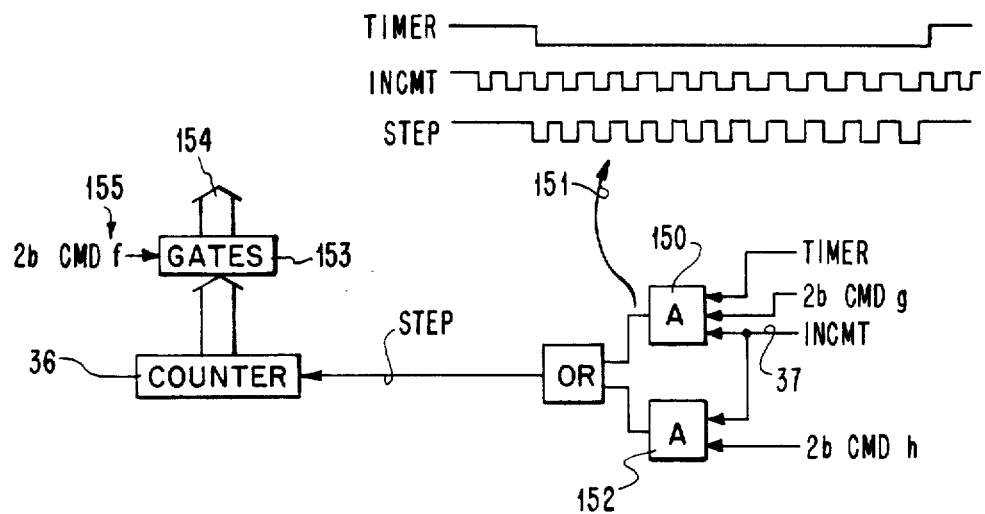
Figure 15:
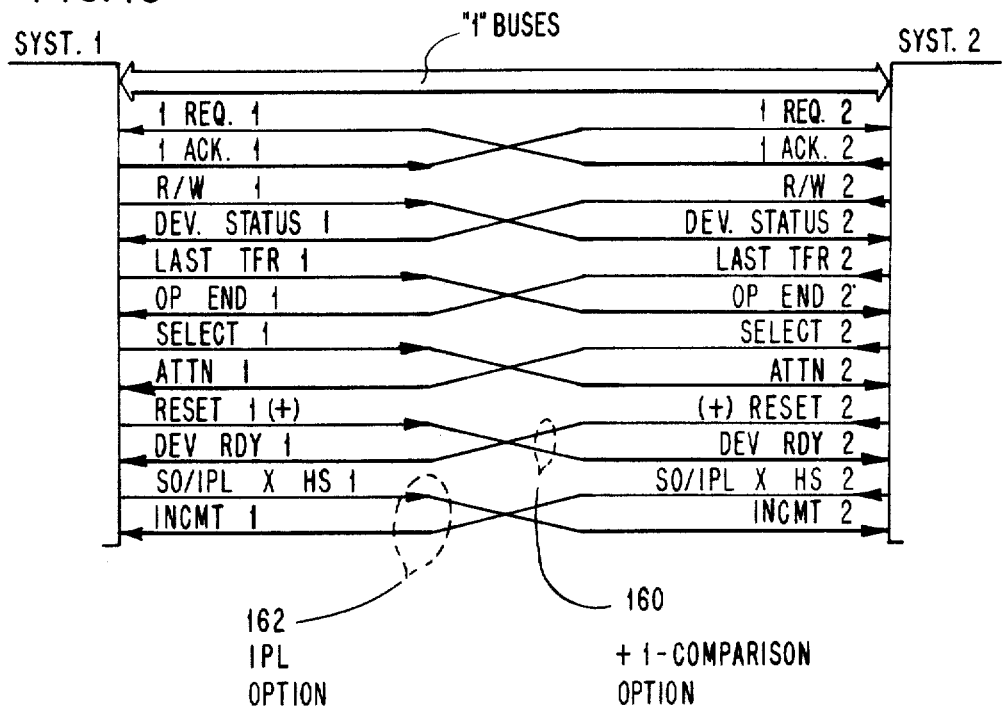
FIG. 15 indicates a symmetry aspect of the subject interface for supporting peer-to-peer system attachments.

FIG. 14 indicates that counter 36 may be incremented in two different modes in response to commands from processor 2b. In one mode AND circuit 150 prepared by a command "g" from processor 2b transfers increment signals from line 37 to counter 36 only while a selected timer output waveform is active (negative). As shown at 151, in this mode the count developed by the counter is limited by the known duration of the timer waveform and can be used thereby as a frequency measurement. In the other mode of operation AND circuit 152 is continuously enabled by command "h" and transfers count pulses to the counter without any time limiting restriction. FIG. 15 also indicates at 155 that gates 153, for transferring counter outputs to processor input bus 154, can be prepared by command functions "f" developed by 2b.

FIG. 15 indicates the card-to-card symmetry of the subject connection interface and its use in association with the B8 ON option. In this application "peer" systems 1 and 2—each having at least a primary processor such as 2a (FIG. 1) cycle stealing adaptation facilities such as 2c, identical interface ports such as 1a and identical interrace lines such as 1b—are connected with certain of their interface ports symmetrically cross-coupled in pairs for sustaining data transfers across their 1 buses 22 (refer to FIG. 2). In this configuration the 1 REQ and 1 ACK ports in the two systems are cross-coupled, R/W and device status are cross-coupled, LAST TFR and OP END are cross-coupled, SELECT and ATTN are cross-coupled, RESET and DEV RDY are cross-coupled and S0 and INCMT are cross-coupled.

As suggested at 160, the RESET lines are "active" when they are pulsed in the positive direction. All other (tag, control and handshaking) lines are active when pulsed negatively. As discussed later, this provides failsafe resetting of devices in certain circumstances, and in the configuration of FIG. 15, it permits pulses applied to one system's reset line to be used for presenting both "device ready" stimulus to the other system and a reference level for comparison purposes (to assure appropriate voltage levels of operation between the two systems). As shown at 162 the "IPL option" (cross-coupling of S0 and INCMT) permits the IPL indicating function (represented by excitation of S0 in HS mode) to be detected in the other system as a change in state of its interface counter (eliminating the need for any separate latches to detect the beginning of IPL mode operation).

With B8 ON in both systems attachment cards, and with both systems powered on and in "device ready" condition relative to each other, the systems proceed to exchange data in the following sequence:

1. The system initiating the transfer issues a DCB instruction to the secondary processor on its attachment card. This instruction (invariably) specifies a (read or write) transfer in HS mode and in 16-bit bidirectional format (B16R or B16W).

2. The attachment card pulses its SELECT line causing an attention interruption in the other (responding) system. Status transmitted during this interruption indicates the direction of transfer chosen by the initiating system (R or W).

3. Software in the primary processor in the responding system (which could be the primary processor of the initiating system if the two attachment cards are attached to different I/O channel ports of one primary system) then issues a DCB instruction specifying HS mode, 16 bit bidirectional format and the opposite transfer direction (W or R) to the attachment card of its system.

4. The attachment card in the responding system pulses its SELECT line presenting an ATTN interruption request to the initiating system. This request and its status may be saved by the secondary processor in the initiating system for later posting to the associated primary processor with OP END interruption status.

5. Now data transfer begins, in 16-bit parallel units, and continues until either the byte count specified in the DCB of the data source system (which could be either the initiating or responding system) is exhausted or an error occurs requiring premature termination.

6. On normal termination (byte count exhausted and no error detected) the system detecting this condition presents LAST TFR to the opposite system, in effect posting an OP END interruption request in the opposite system. This causes an OP END interruption in the opposite system (which may be serviced with the "saved" ATTN interruption if the opposite system is also the initiating system).

7. On abnormal/premature termination the card detecting the error condition posts an exception interruption to its host/primary processor 2a. The other system is not directly notified, but it may be notified later by means of a separate status data transfer operation initiated by supervisory software in the detecting system (with a suitable "write" DCB).

Figure 16:
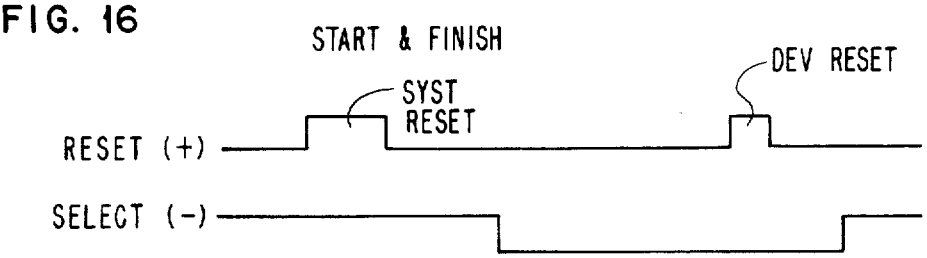
FIGS. 16–21 contain timing diagrams illustrating various system operations supported by the present interface.

FIGS. 16-21 illustrate interface operations at various stages of a data transfer sequence. FIG. 16 indicates the relationship between "select" and "reset". "Select" is activated (negatively pulsed) by the attachment card when it is ready to start a data transfer operation and remains active until the operation terminates (either normally or as a result of detected error). This line is also active during presentation of device reset pulses on the reset line. All of the tag, control and handshake lines other than the reset line are negatively activated and gated by "select" at the attachment card. Outbound data may or may not be gated by select depending on the position of option switch B1 (see FIG. 4). A request pending prior to "activation of "select" cannot be acknowledged until "select" becomes active.

"Reset" is activated in the positive direction and not gated by "select". The powering of device circuitry (e.g. TTL logic) is arranged to hold all device inputs positive if the interface cable should break or if the attachment card should lose power. Accordingly, in such circumstances an active reset condition is manifested to the device automatically and resets the device. In effect, this operates as a failsafe feature to release the device from the disconnected system (so that it may be accessed through other paths or by other systems).

"Select" is not permitted to become active for a predetermined minimum time interval after a system reset. A device reset pulse (shorter than system reset) may be presented while "select" is active, but a predetermined interval of time is then allowed before "select" is permitted to become inactive. These restrictions ensure that devices which have received reset stimulus can stabilize prior to any following operation.

Figure 17:
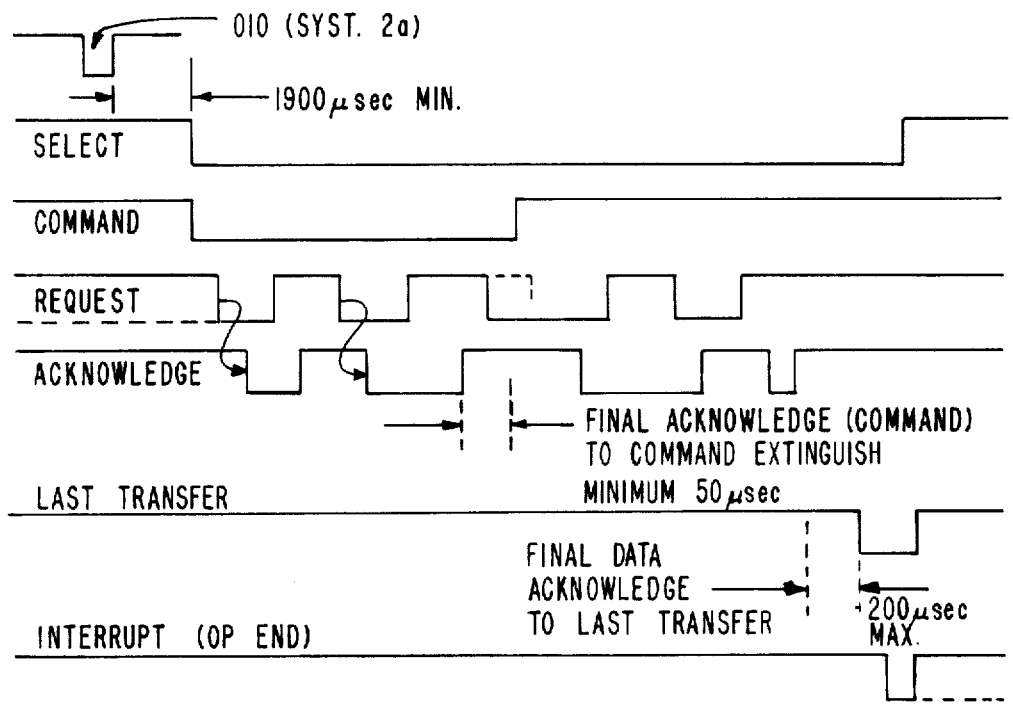

FIG. 17 illustrates the relative usage of "command" and "last transfer". Data transfers (REQ-ACK pairs) occurring while "select" and "command" are both active represent ("write") transfers of command information to the device. Subsequent data transfers, after deactivation of "command", represent (read or write) transfers of "plain data" information. Last transfer is activated after the last unit transfer of plain data.

Figure 18:
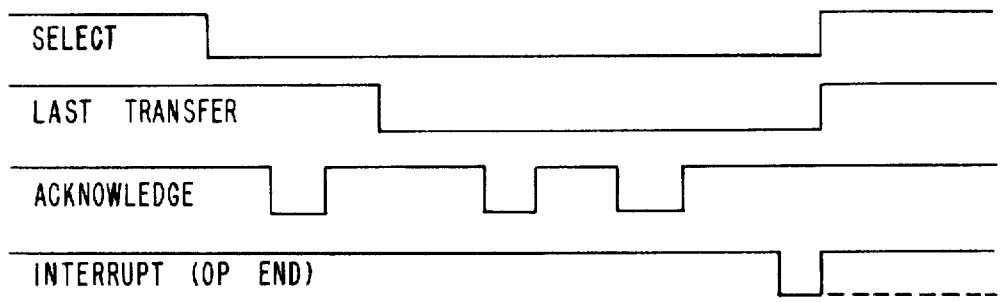

FIG. 18 illustrates the relationship between "last transfer" and "OP END". The leading edge of OP END is triggered in trailing time dependence to "last transfer" and may be held active indefinitely. OP END should be held active at least until "select" goes inactive to assure positive interlocking of attachment and device terminations.

Figure 19:
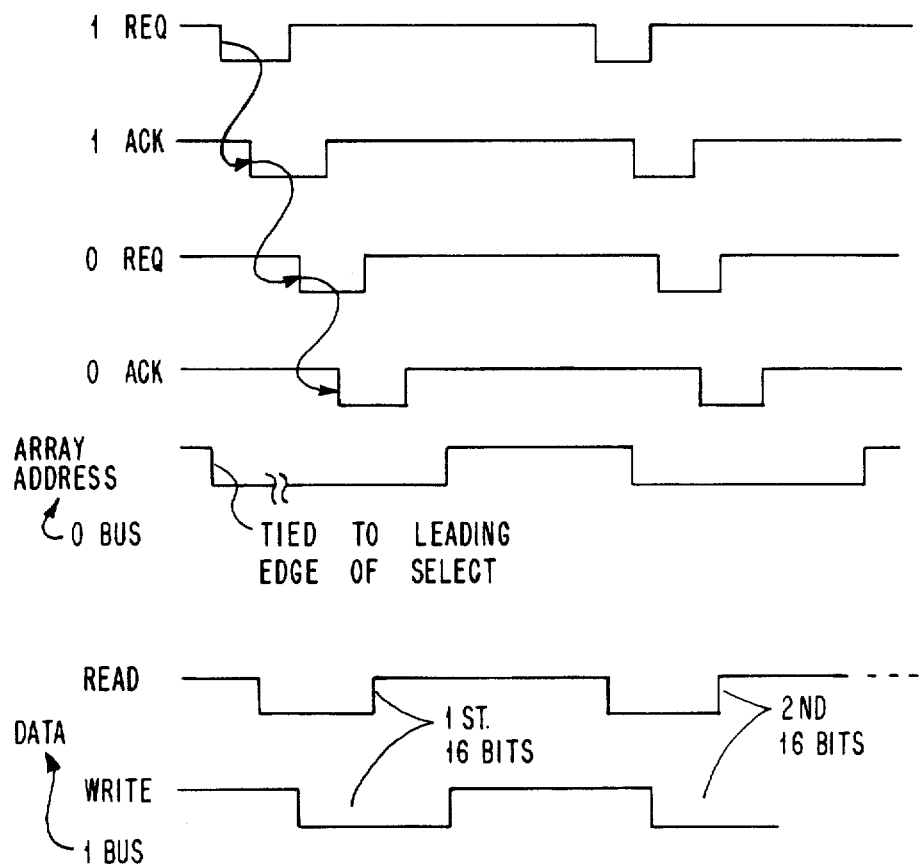

FIG. 19 illustrates the previously mentioned array indexing transfer operation (transfer of an ordered data array in HS 16-bit bidirectional mode/format, with pulsed mode handshake and in association with transfers of array address functions). The data is transferred on "1" bus 22 and the array addresses are transferred on "0" bus 21 (FIG. 3). 0 REQ activations are tied dependently to 1 ACK activations. Consequently, as data is presented for read transfers corresponding array address functions are manifested to the device at the 0 bus. Similarly, upon system acceptance of data presented by the device for write transfers (1 ACK) the array address needed by the device to locate the next unit of data is made available (on the 0 bus) with 0 REQ.

Figure 20:
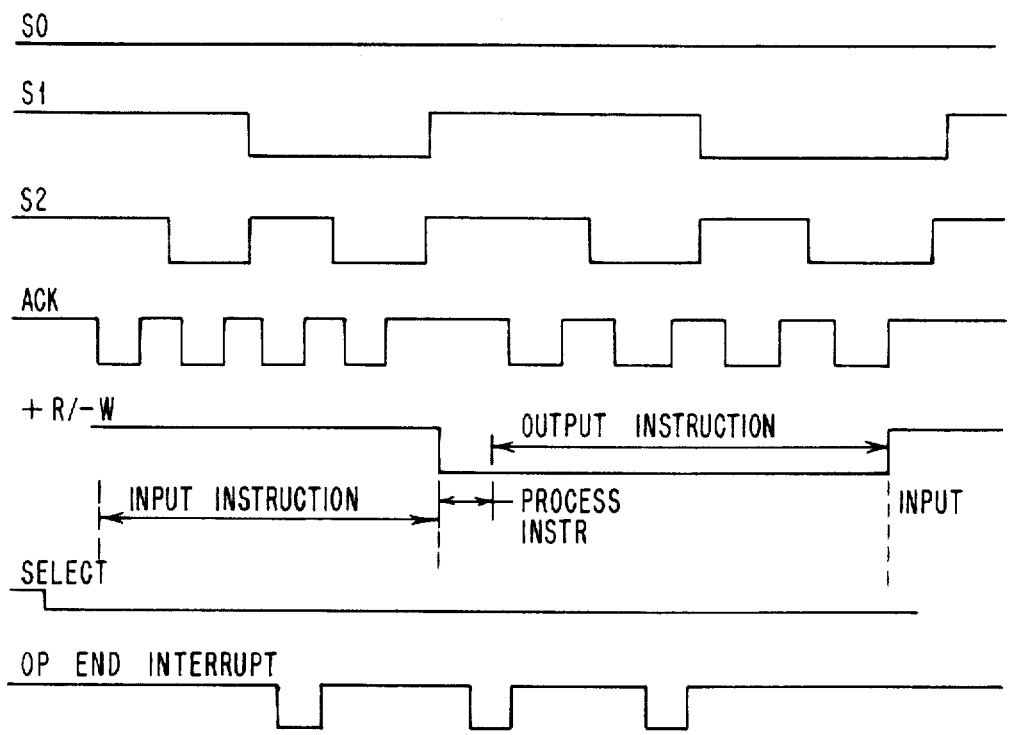

FIG. 20 illustrates interface timing relationships associated with attachment operations in PO (programmable offline) mode. In the illustration digital "sub-address" values, represented collectively by binary states of S0, S1 and S2, vary sequentially through 000, 001, 010, 011 (i.e. through 0-3) twice, while R/W line (31e, FIG. 2) manifests a "read" operation during the first sequence and a "write" operation during the second sequence. This permits the device to distribute (demultiplex) 64 bits of data received from the system to four destinations during the first pass (in discrete 16 bit units) and to transfer (multiplex) 64 bits of data from four sources to the system during the second pass (in 16 bit units). Obviously, if S0 is permitted to vary during these sequences, 128 bits could be sent to 8 destinations and multiplexed from 8 sources. In the illustrated sequence, the attachment and device must adapt their (REQ-ACK) handshake timing appropriately between the reading and writing "sub-addressing" cycles.

Figure 21:
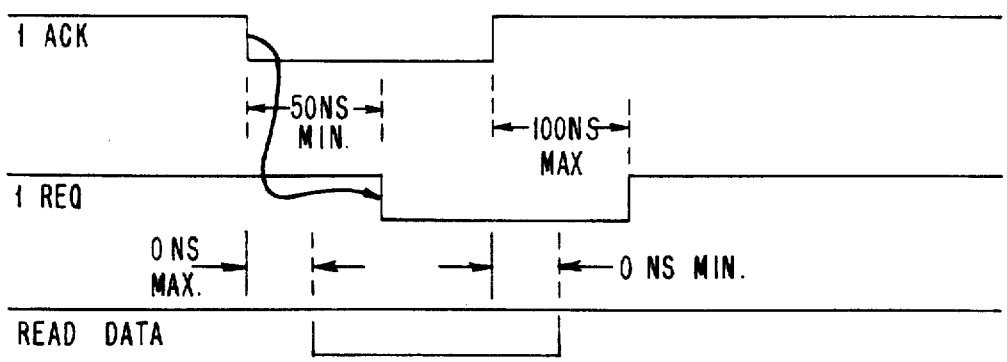

FIG. 21 illustrates handshake timing for card-to-card read transfers (see also FIG. 9). This handshaking mode is selected when option switch B8 is ON, is used only for read transfers, and is a variation of ordinary interlocked mode timing. Card-to-card write transfers use ordinary interlocked mode timing. In card-to-card reads request 1 (1 REQ) activations have leading and trailing edge time dependencies to preceding acknowledge 1 (1 ACK) activations presented by the (peer) writing system.

While there has been described what is at present considered to be a preferred embodiment of this invention, it will be obvious to those skilled in the art that various changes and modifications may be made therein without departing from the invention. It is, therefore, intended to cover all such changes and modifications in the following claims as falling within the true spirit and scope of the invention.

What is claimed is:

1. An interface for connecting a plurality of different types of devices to a data processor comprising:

data port means connected to said processor and devices, and providing a plurality of signal routing paths between said processor and devices, for transferring data signals to and from said processor in a plurality of different bit-parallel formats and from and to said devices in a plurality of different bit-parallel formats;

handshaking port means connected to said processor and devices for exchanging handshaking control signals with said processor and devices in a plurality of different handshaking formats associated with different said bit-parallel formats, said handshaking means directing transfersd of said handshaking control signals in varying formats between said processor and devices for controlling transfers of data in respectively associated varying bit-parallel formats;

a timer port controlled by command signals from said processor for transferring differing timing reference signals to said devices in conformance with differing data transfer characteristics of said devices;

a source of plural different timing signals;

means for selectively connecting any one of the timing signal produced by said source to said timer port; and means coupled to said handshaking port means and said timer port for selectively connecting said timer port to said handshaking port means, whereby timing signals transferred to said timer port are applied selectively as handshaking control signals.

2. An interface in accordance with claim 1 comprising:
handshaking control circuit means responsive to various data transfer commands issued by said processor for operating said handshaking port means selectively in pulsed and interlocked modes relative to said devices.

3. An interface in accordance with claim 1 comprising:
a count input port connected to receive input pulses from said devices;
counting circuit means for developing digital count functions in response to said input pulses; and
means controlled by said processor for transferring count functions from said counting circuit means to said processor.

4. An interface in accordance with claim 3 comprising:
gating means interposed between said count input port and said counting circuit means; and
means for applying timing signals selected by said selectively connecting means to said gating means.

5. An interface for connecting various devices to a data processing system which contains primary and secondary processors and I/O adapter means for transferring data between said interface and either of said processors in association with two distinct modes of operation of said system—namely, a first mode in which said adapter means after being initiated by coordinated operations of said primary and secondary processors transfers data at "high speed" between the primary processor and one or more of said devices and a second mode in which the adapter means is operated under direct control of said secondary processor to transfer data at a "lower speed" between either the primary or secondary processor and one or more of said devices—said interface comprising:
plural data busing ports for transferring data in various bit-parallel formats between said adapter means and said devices;
a mode indicating port for presenting mode indicating signals to said device distinguishing between said first and second modes of operation of said system; and
a selection port for presenting digital selection signals to said devices having a variable selection context dependent on the state of the mode indicating signal concurrently presented at said mode indicating port, said selection signals designating one of a plurality of bit-parallel formats relative to said data ports when said mode indicating signal defines said first mode and the identity of one of a plurality of multiplexed devices when said mode indicating signal defines said second mode.

6. An interface for connecting various devices to a data processor comprising:
a data port associated with said processor for enabling data signals to be transferred between said processor and devices;
a handshaking port associated with said processor for enabling handshaking control signals to be exchanged between said processor and devices;
said handshaking port comprising at least a request inlet for permitting request signals to be transferred from said devices to said processor, an acknowledge outlet for permitting request acknowledgment signals to be sent from the processor to said devices, and a transfer ready outlet for permitting transfer ready signals to be sent from the processor to certain of said devices; and
handshaking control circuit means for selectively operating said handshaking port in various different modes, including at least: a pulsed mode in which said transfer ready outlet is rendered inactive and said request acknowledgment signals presented at said acknowledge outlet are initiated in predetermined time relation to initiations of respective request signals appearing previously at said request inlet, and an interlocked mode in which said request acknowledgment signals are indicated after a predetermined delay following an initial coincidence of request and transfer ready signals at said request inlet and transfer ready outlet and terminated after a predetermined delay following termination of respective request signals.

7. An interface for connecting various different types of devices to a data processing system containing primary and secondary processors and I/O adapter means, said adapter means being adaptable for transferring data between said interface and either of said processors and being operable selectively in autonomous and directly controlled modes W—said adapter means operating in said autonomous mode to transfer various amounts of data to or from said primary processor, after being initiated by programmed operations of said secondary processor, occurring while said secondary processor is operating in synchronism with said primary processor, and operating in said directly controlled mode for transferring predetermined amounts of data between the interface and either of said processors, under direct control of said secondary processor, while said secondary processor is operating in an asynchronous mode relative to said primary processor —said interface comprising:
plural data busing ports for transferring data in various bit-parallel formats between said processors and said devices;
plural handshaking ports, associated individually with respective ones of said data busing ports, for enabling said adapter means and secondary processor to exchange handshaking control signals concurrently with said devices for timing data transfers through said data busing ports; each said handshaking port including:
at least one request input for receiving request signals from said devices, an acknowledge output for transferring request acknowledgement signals to said devices in association with transfers of data to or from the respective data busing port, and a transfer ready output for transferring transfer ready signals to said devices indicating the state of readiness of said system for conducting a data transfer through the respective data busing port;
control circuit means for operating said handshaking ports selectively in pulsed and interlocked modes, with said request input and said acknowledge and transfer ready outputs in various states of enablement and disablement, for causing data to be transferred between said adapter means and said devices, through data busing ports connecting to individual said devices, with various handshaking disciplines and various bit-parallel data formats;
a mode indicating port for transferring mode indicating signals to said devices for distinguishing between said online and offline modes of operation of said secondary processor;

a selection port for transferring selection signals to said devices, said selection signals having variable contexts defined by said mode indicating signals; said selection signals designating thereby either one of a plurality of bit-parallel formats relative to said data busing ports, when said online mode is indicated, or the identity of one of a plurality of multiplexed devices when said offline mode is indicated;

a timer port for transferring time reference pulse signals to said devices;

a source of plural time reference pulse signals having various waveforms;

means controlled by said secondary processor for selectively connecting one of said pulse signal waveforms issuing from said source to said timer port for transfer to a said device;

a count input port for receiving pulses from said devices to be counted;

counting circuit means switchably connectable to said count input port for counting said pulses;

means for controlling said counting circuit means to count said pulses; and means for restricting said controlling means to permit said pulses to be counted only during predetermined time periods defined by said waveforms at said timer port.

* * * * *